United States Patent
Davies et al.

(10) Patent No.: US 7,277,995 B2
(45) Date of Patent: Oct. 2, 2007

(54) STORAGE CONTROLLER AND METHOD FOR PERFORMING HOST ACCESS CONTROL IN THE HOST INTERFACE ADAPTER

(75) Inventors: Ian Davies, Longmont, CO (US); Thomas Wicklund, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 456 days.

(21) Appl. No.: 10/766,784

(22) Filed: Jan. 28, 2004

(65) Prior Publication Data

US 2005/0097271 A1    May 5, 2005

Related U.S. Application Data

(60) Provisional application No. 60/515,530, filed on Oct. 29, 2003.

(51) Int. Cl.
    *G06F 12/00* (2006.01)
(52) U.S. Cl. .................. 711/154; 710/240; 711/111
(58) Field of Classification Search ................ 711/154
    See application file for complete search history.

(56) References Cited

U.S. PATENT DOCUMENTS

| 5,634,111 | A | | 5/1997 | Oeda et al. |
| 5,948,062 | A | | 9/1999 | Tzelnic et al. |
| 6,101,588 | A | * | 8/2000 | Farley ........................ 711/168 |
| 6,343,324 | B1 | * | 1/2002 | Hubis et al. ................ 709/229 |
| 6,356,979 | B1 | | 3/2002 | Sicola et al. |
| 6,425,035 | B2 | | 7/2002 | Hoese et al. |
| 6,480,934 | B1 | * | 11/2002 | Hino et al. .................. 711/114 |
| 6,859,867 | B1 | * | 2/2005 | Berry .......................... 711/206 |
| 6,999,999 | B2 | * | 2/2006 | Camble et al. ............. 709/215 |
| 7,043,663 | B1 | * | 5/2006 | Pittelkow et al. ............... 714/4 |
| 7,107,359 | B1 | * | 9/2006 | Burton et al. ............... 709/250 |
| 2001/0023463 | A1 | | 9/2001 | Yamamoto et al. |
| 2002/0194294 | A1 | | 12/2002 | Blumenau et al. |
| 2002/0199071 | A1 | * | 12/2002 | Kitamura et al. ........... 711/152 |

OTHER PUBLICATIONS

"Security and Data Access Control with InfoSlice Storage Arrays"; obtained from http://wwww.technomagesinc.com/pdf/IS_ACL_config.pdf; accessed on Nov. 29, 2003.

(Continued)

*Primary Examiner*—Brian R. Peugh
*Assistant Examiner*—Matthew Bradley
(74) *Attorney, Agent, or Firm*—E. Alan Davis; James W. Huffman

(57) ABSTRACT

A storage controller that provides controlled access to storage devices by host computers is disclosed. The storage controller includes a host interface adapter that interfaces the storage controller to the hosts, a device interface adapter that interfaces the storage controller to the storage devices, and a microprocessor that processes requests by the hosts to access the storage devices. An access control table is created in response to user input in a memory accessible by the host interface adapter. When the host interface adapter receives a request, it determines from the access control table whether the requesting host has permission to access the specified storage device. If so, the host interface adapter forwards the request to the microprocessor. Otherwise, the host interface adapter transmits a response to the host denying access in one embodiment, or in another embodiment, provides an indication to the microprocessor that access should be denied.

69 Claims, 10 Drawing Sheets

Access Control Operation

OTHER PUBLICATIONS

Phil Mills; "Enterprise Storage Server Fibre Channel Attachment Version 5.01"; Dec. 15, 2000; pp. 1, 19-23; San Jose, CA, USA.
Gustavo Castets, Peter Crowhurst, Stephen Garraway, Guenther Rebmann; IBM TotalStorage Enterprise Storage Server Model 800; obtained from http://publib-b.boulder.ibm.com/Redbooks.nsf/RedbookAbstracts/sg246424.html?Open; Accessed Dec. 16, 2003. pp. 1, 3-4, 108-110, which are also document page numbers: cover, i, ii, 84-86.

* cited by examiner

Fig. 3

Access Control Table

300

| LSD ID | access type | host list |
|---|---|---|
| 0 | include list | C, D, E |
| 1 | exclude list | B, E |
| 2 | exclude all | n/a |
| 3 | include all | n/a |
| 4 | exclude all | n/a |
| 5 | exclude all | n/a |
| 6 | exclude all | n/a |
| 7 | exclude all | n/a |

Fig. 4

Access Control Table (Alternate Embodiment)

400

| host ID | LSD ID list |
|---|---|
| A | 1, 3 |
| B | 3 |
| C | 0, 1, 3 |
| D | 0, 1, 3 |
| E | 0, 3 |
| F | 1, 3 |

Fig. 5

Mapping Table 500

| host ID | external LSD ID to internal LSD ID mapping list |
|---|---|
| A | (0,1) (1,3) (2,X) (3,X) (4,X) (5,X) (6,X) (7,X) |
| B | (0,3) (1,X) (2,X) (3,X) (4,X) (5,X) (6,X) (7,X) |
| C | (0,1) (1,3) (2,0) (3,X) (4,X) (5,X) (6,X) (7,X) |
| D | (0,1) (1,3) (2,0) (3,X) (4,X) (5,X) (6,X) (7,X) |
| E | (0,3) (1,0) (2,X) (3,X) (4,X) (5,X) (6,X) (7,X) |
| F | (0,1) (1,3) (2,X) (3,X) (4,X) (5,X) (6,X) (7,X) |

Fig. 6

Mapping Table (Alternate Embodiment) 600

| external LSD ID | host to internal LSD ID mapping list |
|---|---|
| 0 | (A,1) (B,3) (C,1) (D,1) (E,3) (F,1) |
| 1 | (A,3) (B,X) (C,3) (D,3) (E,0) (F,3) |
| 2 | (A,X) (B,X) (C,0) (D,0) (E,X) (F,X) |
| 3 | (A,X) (B,X) (C,X) (D,X) (E,X) (F,X) |
| 4 | (A,X) (B,X) (C,X) (D,X) (E,X) (F,X) |
| 5 | (A,X) (B,X) (C,X) (D,X) (E,X) (F,X) |
| 6 | (A,X) (B,X) (C,X) (D,X) (E,X) (F,X) |
| 7 | (A,X) (B,X) (C,X) (D,X) (E,X) (F,X) |

Access Control Operation

Access Control Table and Mapping Table Creation

Access Control Table
(Alternate Embodiment Supporting Request Routing)

| LSD ID | access type | host list | microprocessor |
|---|---|---|---|
| 0 | include list | C, D, E | 0 |
| 1 | exclude list | B, E | 2 |
| 2 | exclude all | n/a | 1 |
| 3 | include all | n/a | 1 |
| 4 | exclude all | n/a | 0 |
| 5 | exclude all | n/a | 0 |
| 6 | exclude all | n/a | 0 |
| 7 | exclude all | n/a | 0 |

Access Control Operation with Request Routing

STORAGE CONTROLLER AND METHOD FOR PERFORMING HOST ACCESS CONTROL IN THE HOST INTERFACE ADAPTER

PRIORITY INFORMATION

This application claims priority based on U.S. Provisional Application, Ser. No. 60/515,530, filed Oct. 29, 2003, entitled METHOD FOR PROVIDING LUN ZONING IN A FIBRE CHANNEL DEVICE USING THE FIBRE CHANNEL PROTOCOL CONTROLLER.

FIELD OF THE INVENTION

This invention relates in general to the field of storage controllers and particularly to access control in storage controllers.

BACKGROUND OF THE INVENTION

Historically, computer networks have been made up of multiple computers connected together by some data transport medium, such as Ethernet cables, that enables the computers to communicate with one another. Each computer has its own central processing unit for executing programs to process data and its own local storage device, such as a disk drive, for storing the programs and data. In this arrangement, each computer controls access to its own local storage and selectively enables access by other computers on the network to its local storage.

However, certain disadvantages exist in this arrangement, particularly if the computers are part of a network of a single fiscal entity, such as a corporation or university. One potential disadvantage is the inefficient use of the storage devices. Each computer must have a disk drive, but may only use a relatively small percentage of the space on the disk drive with the remainder of the space being wasted. A second potential disadvantage is the difficulty of managing the storage devices for the potentially many computers in the network. A third potential disadvantage is that the localized storage arrangement does not facilitate applications in which the various users of the network need to access a common large set of data, such as a database. These disadvantages, among others, have caused a trend toward more centralized, shared storage in computer networks.

Today, many computer networks include centralized, shared storage devices. Because the storage devices are centralized, they can be managed more easily by network administrators. Additionally, the network administrators can monitor the amount of storage space needed and incrementally add storage devices on an as-needed basis, thereby more efficiently using storage device space. Furthermore, because the data is centralized, all the users of the network who need to access a database, for example, can do so without overloading one user's computer.

In the centralized, shared storage model, the network may include a storage controller that has multiple storage devices connected to it that provide a relatively large amount of storage space. Each of the computers is networked to the storage controller and the storage controller provides access to the storage space. In this model, the need may still exist for access to be controlled to different portions of the storage space by different users. For example, different departments in a corporation may exist, and each department may desire to keep its data separate and deny the other departments access to its data. In the centralized, shared storage model, the storage controller must perform this access control function.

Current storage controllers include a microprocessor that performs the access control function. The microprocessor examines each request from the computers in the network and determines whether the computer requesting access to the storage device specified in the request has permission to access the specified storage device. However, the microprocessor has many other functions that it must perform in addition to the access control function. For example, if the storage controller is a redundant array of inexpensive disks (RAID) controller, the microprocessor must determine which sectors on which physical disk drive or drives the data specified in the computer's request must be accessed to read or write the data. That is, the microprocessor must perform the striping or mirroring associated with RAID requests. Additionally, the microprocessor may be required to perform the exclusive-OR operations of the data required in the RAID 5 level, for example, or to at least initiate the exclusive-OR operation by another circuit. Furthermore, the storage controller typically includes relatively large amounts of buffer memory for buffering data as it is transferred between the storage devices and the computers on the network. The microprocessor performs the task of managing use of the buffer and perhaps managing the buffer as a cache memory.

Furthermore, since the different computers in the network may have access to only a subset of the storage devices, the computers may refer to the storage devices by a different set of identifiers than the microprocessor uses to identify the storage devices. Hence, the microprocessor must perform a mapping function to map the identifier used in a request from one of the computers to access a storage device to the unique identifier used by the microprocessor to identify the storage device.

As the number of storage devices and computers accessing the storage devices increases, the microprocessor may become overloaded performing all of its various functions in addition to the access control function and mapping function, and may become the bottleneck for the processing of data requests. Therefore what is needed is a storage controller and method for offloading the access control function or the mapping function or both from the microprocessor.

SUMMARY

In one aspect, the present invention provides a storage controller in which the access control function is performed by a host interface adapter in the storage controller rather than by the microprocessor, thereby offloading the access control function from the microprocessor and freeing up the microprocessor to perform its other functions more effectively. The storage controller includes a storage device interface adapter that interfaces a plurality of logical storage devices to the storage controller. The storage controller also includes at least one host interface adapter that interfaces a plurality of host computers to the storage controller. The storage controller also includes a microprocessor that processes requests by the hosts to access the logical storage devices. When the host interface adapter receives a request from one of the hosts, the host interface adapter looks up the host identifier and logical storage device identifier specified in the request in an access control table to determine whether the specified host has access to the specified logical storage device. If so, the host interface adapter forwards the request to the microprocessor for processing. If the request is a read request, the microprocessor controls the device interface adapter to transfer data from the specified logical storage device to a buffer on the storage controller and controls the host interface adapter to transfer the data from the buffer to the host. If the request is a write request, the microprocessor controls the host interface adapter to transfer data from the host to the buffer and then controls the device interface adapter to transfer data from the buffer to the specified logical storage device. The microprocessor manages use of the buffer amongst various requests and data transfers.

If the specified host does not have access to the specified logical storage device, then in one embodiment, the host interface adapter transmits to the host a response that indicates the host does not have permission to access the specified logical storage device. In another embodiment, the host interface adapter provides an indication to the microprocessor that the host does not have permission to access the specified logical storage device and forwards the request to the microprocessor. The microprocessor controls the host interface adapter to transmit to the host a response indicating that the host does not have permission to access the specified logical storage device. In one embodiment, the host interface adapter includes its own sequencer, or processor, that executes program instructions stored in a memory of the host interface adapter. In one embodiment, the access control table is stored in the sequencer memory. In another embodiment, the access control table is stored in the buffer memory.

The access control table is built by the storage controller in a memory accessible to the host interface adapter, such as the sequencer memory or the buffer memory. In one embodiment, a user, such as a network administrator, inputs access control information to the storage controller which the storage controller uses to build the access control table. In one embodiment, the storage controller includes a management controller that receives the input from the user.

In another aspect, the host interface adapter also performs a storage device identifier mapping function, thereby off-loading that function from the microprocessor so that it may more efficiently perform its other functions. The storage controller refers to the logical storage devices using an internal set of identifiers. However, the network administrator may input mapping information to enable the storage controller to create a mapping table that maps a set of external logical storage device identifiers to the internal logical storage device identifiers. The mapping table is accessible to the host interface adapter, which uses the mapping table to map the external identifier provided in the host request to an internal identifier for use in performing the access control function and for use by the microprocessor in processing the requests. The external to internal identifier mapping may be unique for each host connected to the host interface adapter. For example, each of the hosts may refer to a different logical storage device of the storage controller by the same external ID, such as ID 0.

In another aspect, the storage controller includes a plurality of microprocessors for processing host requests. Each microprocessor processes requests for a subset of the logical storage devices. The host interface adapter performs a routing function for the host requests to the various microprocessors. That is, when the host interface adapter receives a host request, it determines which of the microprocessors is designated to process requests for the logical storage device specified in the request and routes the request to the designated microprocessor, thereby alleviating the microprocessors of the burden of routing the requests to the designated microprocessor.

BRIEF DESCRIPTION OF THE DRAWINGS

FIG. 3 is a block diagram illustrating an access control table of the storage controller of FIG. 1 according to one embodiment of the present invention.

FIG. 4 is a block diagram illustrating an access control table of the storage controller of FIG. 1 according to an alternate embodiment of the present invention.

FIG. 5 is a block diagram illustrating a mapping table according to one embodiment of the present invention.

FIG. 6 is a block diagram illustrating a mapping table according to an alternate embodiment of the present invention.

DETAILED DESCRIPTION

Figure 1:
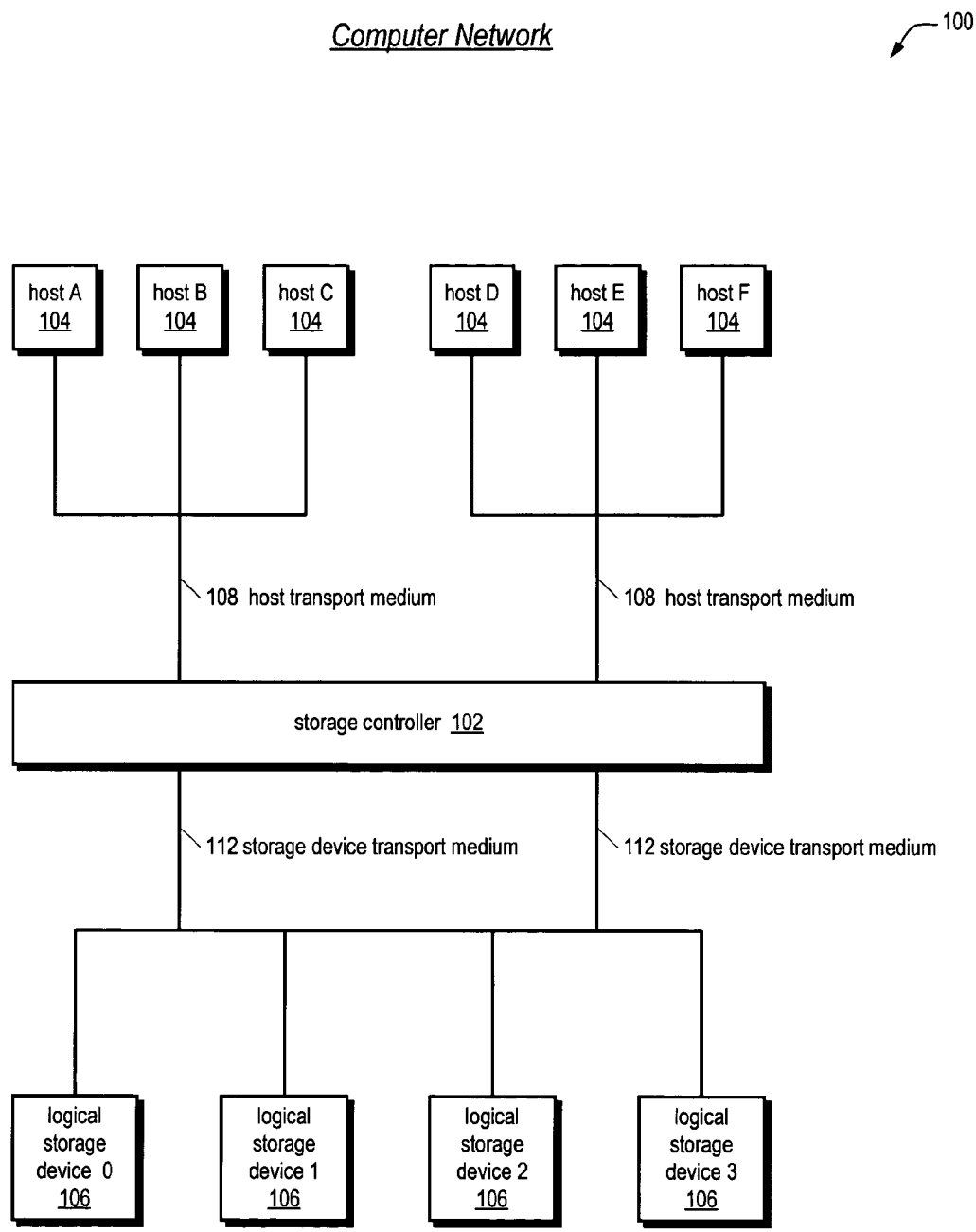
FIG. 1 is a block diagram of a computer network according to the present invention.

Referring now to FIG. 1, a block diagram of a computer network 100 according to the present invention is shown. The computer network 100 includes a plurality of host computers 104, and plurality of logical storage devices 106, and a storage controller 102. The storage controller 102 provides controlled access by the host computers 104 to the logical storage devices 106. The host computers 104 are coupled to the storage controller 102 via a host transport medium 108. The logical storage devices 106 are coupled to the storage controller 102 via a storage device transport medium 112. In one embodiment, the coupling of the host computers 104 to the storage controller 102 may comprise a network that may include switches and/or routers. Similarly, the coupling of the logical storage devices 106 to the storage controller 102 may comprise a network that may include switches and/or routers.

The embodiment of FIG. 1 illustrates six host computers 104 denoted host A, host B, host C, host D, host E, and host F. Hosts A, B, and C 104 are coupled to storage controller 102 via a first host transport medium, and hosts D, E, and F are coupled to storage controller 102 via a second host transport medium. The embodiment of FIG. 1 illustrates four logical storage devices 106 denoted device 0, device 1, device 2, and device 3, each redundantly coupled to storage controller 102 via a pair of storage device transport mediums 112.

The host computers 104 may be any type of computer, including but not limited to a file server, print server, enterprise server, workstation, personal computer, notebook computer, or PDA. Each of the host computers 104 include an interface adapter for interfacing the host computer 104 to the host transport medium 108 and performing a protocol for communicating with the storage controller 102 via the host transport medium 108. The host transport medium 108 and protocol may be any that enable data transfers between the host computers 104 and the storage controller, including but not limited to Fibre Channel, Infiniband, Ethernet, TCP/IP, Small Computer Systems Interface (SCSI), HIPPI, Token Ring, Arcnet, FDDI, LocalTalk, ESCON, FICON, ATM, Serial Attached SCSI (SAS), Serial Advanced Technology Attachment (SATA), or combinations thereof. The host computers 104 and storage controller 102 may communicate using stacked protocols, such as SCSI over Fibre Channel or Internet SCSI (iSCSI).

The logical storage devices 106 may comprise a single physical storage device, including but not limited to disk drives, tape drives, or optical drives. The logical storage devices 106 may also comprise a grouping of physical storage devices using any of well-known methods for grouping storage devices, including but not limited to mirroring, striping, or other redundant array of inexpensive disks (RAID) methods. The logical storage devices 106 may also comprise a portion of a single physical storage device or a portion of a grouping of storage devices. The logical storage devices 106 include an interface adapter for interfacing the logical storage device 106 to the storage device transport medium 112 and performing a protocol for communicating with the storage controller 102 via the storage device transport medium 112. The storage device transport medium 112 and protocol may be any that enable data transfers between the logical storage devices 106 and the storage controller 102, including but not limited to Fibre Channel, Advanced Technology Attachment (ATA), SAS, SATA, Ethernet, Infiniband, SCSI, HIPPI, ESCON, FICON, or relevant combinations thereof. The logical storage devices 106 and storage controller 102 may communicate using stacked protocols, such as SCSI over Fibre Channel or Internet SCSI (iSCSI). Preferably, at least a portion of the protocol employed between the storage controller 102 and the host computers 104 and the storage controller 102 and the logical storage devices 106 include a low-level block interface, such as the SCSI protocol.

Figure 2:
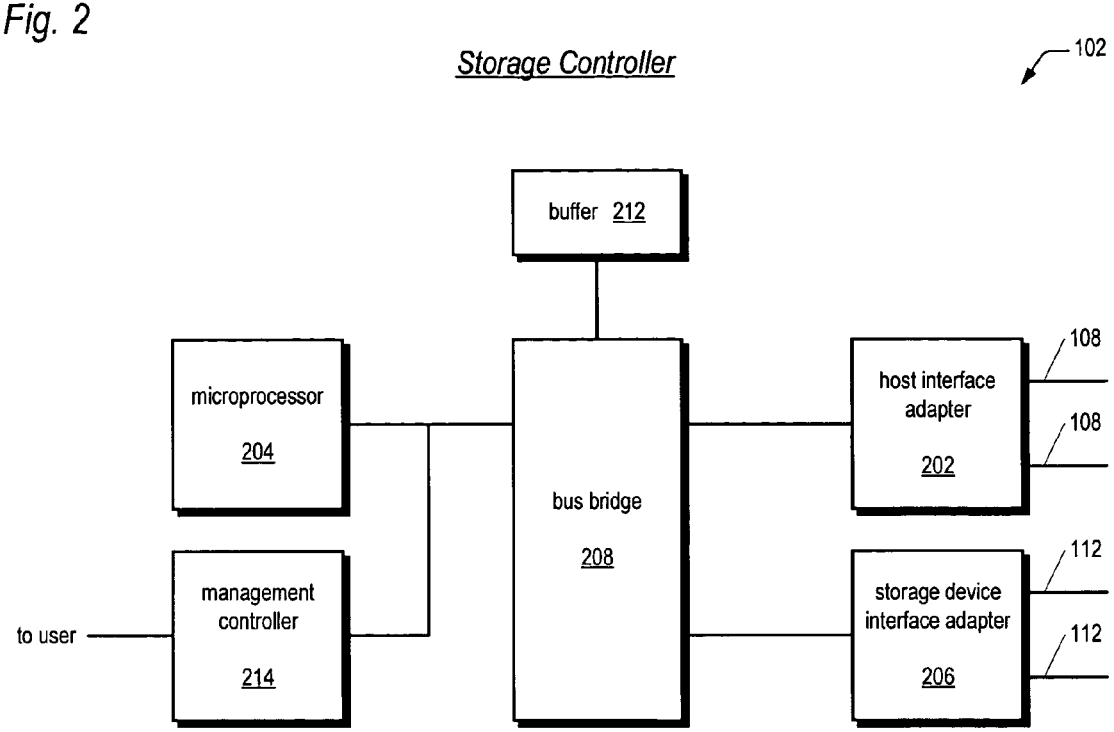
FIG. 2 is a block diagram of the storage controller of FIG. 1 according to the present invention.

Referring now to FIG. 2, a block diagram of the storage controller 102 of FIG. 1 according to the present invention is shown.

Storage controller 102 includes a host interface adapter 202, a storage device interface adapter 206, a microprocessor 204, a bus bridge 208, a buffer memory 212, and a management controller 214. In one embodiment, the host interface adapter 202, storage device interface adapter 206, and microprocessor 204 are each coupled to the bus bridge 208 by a corresponding local bus, as shown. In one embodiment, the local buses comprise a high speed local bus, including but not limited to a PCI, PCI-X, CompactPCI, or PCI Express bus. In one embodiment, the bus bridge 208 also includes a memory controller for controlling the buffer memory 212. In one embodiment, the buffer 212 and the bus bridge 208 are coupled by a double-data-rate (DDR) memory bus. The bus bridge 208 enables each of the microprocessor 204, host interface adapter 202, and storage device interface adapter 206 to communicate with one another and to transfer data to and from the buffer 212. In one embodiment, the microprocessor 204 comprises a Pentium III® microprocessor, and is coupled to the local bus by a second bus bridge, such as a bus bridge commonly referred to as a north bridge. In one embodiment, the microprocessor 204 is also coupled to a memory for storing program instructions and data for execution by the microprocessor 204. In one embodiment, the management controller 214 comprises an Advanced Micro Devices® Elan™ microcontroller, and is coupled to the local bus by a third bus bridge, such as a bus bridge commonly referred to as a south bridge. In one embodiment, the management controller 214 also is coupled to a memory for storing program instructions and data for execution by the management controller 214.

The host interface adapter 202 is coupled to the host transport medium 108 of FIG. 1. In one embodiment, the host interface adapter 202 includes two ports for interfacing to two host transport mediums 108, as shown. The storage device interface adapter 206 is coupled to the storage device transport medium 112 of FIG. 1. In one embodiment, the storage device interface adapter 206 includes two ports for interfacing to two storage device transport mediums 112, as shown. The management controller 214 receives user input from a user for configuring and managing the storage controller 102, as described below. In one embodiment, the management controller 214 receives input from the user via a serial interface such as an RS-232 interface. In one embodiment, the management controller 214 receives user input from the user via an Ethernet interface and provides a web-based configuration and management utility. In addition to its configuration and management functions, the management controller 214 also performs monitoring functions, such as monitoring the temperature, presence, and status of the logical storage devices 106 or other components of the system, and monitoring the status of other critical system components, such as fans or power supplies.

The storage device interface adapter 206 interfaces the storage controller 102 with the storage device transport medium 112. The storage device interface adapter 206 performs the protocol necessary to enable the logical storage devices 106, and in particular the physical storage devices that comprise the logical storage devices 106, to communicate with the storage controller 102. For example, in one embodiment, the storage device interface adapter 206 comprises a JNIC-1560 Milano dual channel Fibre Channel to PCI-X controller developed by the JNI Corporation™ that performs the Fibre Channel protocol for transferring Fibre Channel packets between the physical storage devices comprising the logical storage devices 106 and the storage controller 102. The storage device interface adapter 206 includes a direct memory access controller (DMAC) for transferring data directly between the storage device transport medium 112 and the buffer 212 via the bus bridge 208.

The host interface adapter 202 interfaces the storage controller 102 with the host transport medium 108. The host interface adapter 202 is a special purpose controller designed to perform the protocol necessary to enable the hosts 104 to communicate with the storage controller 102. For example, in one embodiment, the host interface adapter 202 comprises a second JNIC-1560 Milano dual channel Fibre Channel to PCI-X controller that performs the Fibre Channel protocol for transferring Fibre Channel packets between the host computers 104 and the storage controller 102. The host interface adapter 202 includes a direct memory access controller (DMAC) for transferring data directly between the host transport medium 108 and the buffer 212 via the bus bridge 208. In one embodiment, the host interface adapter 202 includes a sequencer, or processor, and a memory for storing program instructions and data to be executed by the sequencer. In one embodiment, the sequencer comprises a micro-programmable control engine.

In one embodiment, the host interface adapter 202 operates as both a master and a slave on the local bus. For example, the host interface adapter 202 operates as a slave on the local bus when being programmed by the microprocessor 204, and operates as a master on the local bus when transferring data to or from the buffer 212.

The host interface adapter 202 controls access by the host computers 104 to the logical storage devices 106 of FIG. 1. That is, when the host interface adapter 202 receives an input/output (I/O) request from one of the host computers 104 to access one of the logical storage devices 106, the host interface adapter 202 determines whether the requesting host computer 104 has permission to access the specified logical storage device 106, as described in detail below. Additionally, the host interface adapter 202 maps external identifiers used by the host computers 104 to identify the logical storage devices 106 to internal identifiers used by the storage controller 102 to identify the logical storage devices 106, as described in detail below. Finally, in one embodiment, the host interface adapter 202 determines which of a plurality of microprocessors 204 is designated to process requests from the host computers 104 for the specified logical storage device 106, and routes the request to the designated microprocessor 204, as described in detail below.

The microprocessor 204 receives host computer 104 I/O requests from the host interface adapter 202 and processes the requests. Processing the requests may include various functions. However, specifically, the microprocessor 204 does not perform the access control function to the logical storage devices 106; rather, the access control function is performed by the host interface adapter 202 as described in detail below. Additionally, the microprocessor 204 does not perform the logical storage device 106 external to internal identifier mapping function; rather, the external to internal identifier mapping function is performed by the host interface adapter 202 as described in detail below.

As mentioned above, the logical storage devices 106 may be comprised of groups of physical storage devices or a portion of a single physical storage device or a portion of a group of physical storage devices or a single physical storage device. Hence, the logical block number and number of blocks of data to be transferred that is specified in the I/O request of the logical storage device 106 to which data is to be written typically does not correspond to the appropriate physical block numbers and number of blocks on the one or more physical storage devices comprising the logical storage device 106. Therefore, the logical block number specified in the host I/O request must be translated into the appropriate physical block number and physical storage device to be used in performing one or more data transfers between the storage controller 102 and the physical storage devices comprising the logical storage device 106. This translation function is performed by the microprocessor 204. In one embodiment, the microprocessor 204 performs the translation according to well-known RAID algorithm techniques. After performing the translation, the microprocessor 204 programs the storage device interface adapter 206 to perform the data transfers between the physical storage devices and the buffer 212. Additionally, the microprocessor 204 programs the host interface adapter 202 to perform data transfers between the host computers 104 and the buffer 212. Thus, when processing a host I/O request to write data from a host computer 104 to a logical storage device 106, the microprocessor 204 programs the host interface adapter 202 to transfer data from the host computer 104 to the buffer 212; after the data is received into the buffer 212, the microprocessor 204 programs the storage device interface adapter 206 to transfer the data from the buffer 212 to the translated appropriate physical block numbers of the physical storage devices comprising the logical storage device 106. Conversely, when processing a host I/O request to read data from a logical storage device 106 to a host computer 104, the microprocessor 204 programs the storage device interface adapter 206 to transfer the data to the buffer 212 from the translated appropriate physical block numbers of the physical storage devices comprising the logical storage device 106; after the data is received into the buffer 212, the microprocessor 204 programs the host interface adapter 202 to transfer the data to the host computer 104 from the buffer 212. The microprocessor 204 also performs the function of managing allocation of portions of the buffer 212 for performing the data transfers. In one embodiment, the microprocessor 204 also manages the buffer 212 as a cache memory for caching portions of the data buffered in buffer 212 in order to improve I/O performance between the logical storage devices 106 and the host computers 104 according to well-known caching techniques. In one embodiment, the microprocessor 204 performs exclusive-OR operations of the data required in certain RAID levels, such as RAID level 5. In one embodiment, the microprocessor 204 programs a dedicated exclusive-OR circuit to perform the exclusive-OR operation on the data.

In one embodiment, the microprocessor 204, buffer 212, bus bridge 208, and management controller 214 are comprised in a first circuit board which is coupled via a local bus backplane to a second circuit board comprising the host interface adapter 202 and storage device interface adapter 206. In another embodiment, the management controller 214 is comprised on a separate circuit board than a circuit board including the other elements of storage controller 102. In one embodiment, the local bus backplane is passive and hot-pluggable.

Referring now to FIG. 3, a block diagram illustrating an access control table 300 of the storage controller 102 of FIG. 1 according to one embodiment of the present invention is shown. In one embodiment, the access control table 300 resides in the buffer memory 212 of FIG. 2. In another embodiment, the access control table 300 resides in the memory of the host interface adapter 202 that is used to store program instructions and data for the host interface adapter 202 sequencer.

The access control table 300 includes an entry for each logical storage device identifier (LSD ID) that a host computer 104 is allowed to specify in a request. In one embodiment, the storage controller 102 is logically viewed by the host computers 104 as a SCSI target controller. That is, the host computers 104 send requests to the storage controller 102 which include a SCSI request comprising a command descriptor block. In one embodiment, the host transport medium 108 coupling the storage controller 102 to the host computers 104 is a SCSI bus on which the SCSI request is transmitted. In one embodiment, the host transport medium 108 is a Fibre Channel network, and the SCSI request is included in a Fibre Channel packet, as in Fibre Channel SCSI. In one embodiment, the host transport medium 108 is an Ethernet network, and the SCSI request is included in a TCP/IP packet, as in iSCSI. The SCSI request specifies a logical unit number (LUN). In one embodiment, the SCSI LUN corresponds to the LSD ID.

Each entry of the access control table 300 includes a field with the logical storage device 106 identifier (LSD ID). The access control table 300 shown in FIG. 3 illustrates an embodiment in which the SCSI LUN specified by the host computer 104 corresponds to the LSD ID. In one embodiment, the number of allowable SCSI LUNs is eight, which are denoted 0 through 7. Hence, the access control table 300 includes an entry for each of LUNs 0 through 7, as shown. In another embodiment, the number of allowable SCSI LUNs is 128. In another embodiment, the number of allowable SCSI LUNs is 2048. FIG. 3 illustrates an access control table 300 for the network 100 of FIG. 1 as an example.

Each entry of the access control table 300 also includes a field specifying the access type used for the logical storage device 106. Each entry of the access control table 300 also includes a host list field. The possible access types are "include all", "exclude all", "include list", and "exclude list." The "include all" access type indicates that all hosts 104 connected to the host interface adapter 202 have permission to access the logical storage device 106 specified by the LSD ID. The "exclude all" access type indicates that none of the hosts 104 connected to the host interface adapter 202 have permission to access the logical storage device 106 specified by the LSD ID. The "include list" access type indicates that the particular hosts 104 connected to the host interface adapter 202 that are listed in the host list field have permission to access the logical storage device 106 specified by the LSD ID. The "exclude list" access type indicates that the particular hosts 104 connected to the host interface adapter 202 that are listed in the host list field do not have permission to access the logical storage device 106 specified by the LSD ID.

In the example shown in FIG. 3, LSD 0 has an access type of "include list", with host C, host D, and host E in the host list; LSD 1 has an access type of "exclude list", with host B, and host E in the host list; LSD 2 has an access type of "exclude all"; LSD 3 has an access type of "include all"; and LSDs 4 through 7 have an access type of "exclude all" because LSDs 4 through 7 do not exist in the network 100 of FIG. 1.

In one embodiment, the hosts 104 in the host list field are specified according to a world wide name associated with each host 104, or port of each host 104, such as a Fibre Channel, Ethernet, or FDDI world wide unique name assigned by a naming authority. In FIG. 3, the hosts 104 are denoted A through F corresponding to their designation in FIG. 1. In one embodiment, a user provides input to the storage controller 102 to specify the world wide name of each of the hosts 104 and which of the logical storage devices 106 each of the hosts 104 has permission to access. Creation of the access control table 300 is described in more detail below with respect to FIG. 9.

Referring now to FIG. 4, a block diagram illustrating an access control table 400 of the storage controller 102 of FIG. 1 according to an alternate embodiment of the present invention is shown. In one embodiment, the access control table 400 resides in the buffer memory 212 of FIG. 2. In another embodiment, the access control table 400 resides in the memory of the host interface adapter 202 that is used to store program instructions and data for the host interface adapter 202 sequencer.

The access control table 400 includes an entry for each of the hosts 104 coupled to the host interface adapter 202. FIG. 4 illustrates an access control table 400 for the network 100 of FIG. 1; hence, the access control table 400 has six entries. Each entry of the access control table 400 includes a host ID field with an identifier of a host 104. Each entry of the access control table 400 also includes an LSD ID list field. The host 104 specified in the host ID field has permission to access each logical storage device 106 whose LSD ID is listed in the LSD ID list field.

Referring now to FIG. 5, a block diagram illustrating a mapping table 500 according to one embodiment of the present invention is shown. In one embodiment, the LSD IDs supplied by the host computers 104 in a request map directly to the LSD IDs used internally by the storage controller 102. However, in another embodiment, the LSD IDs supplied by the host computers 104 in a request do not map directly to the internal LSD ID used by the microprocessor 204 to uniquely identify the logical storage devices 106. In this embodiment, the LSD ID supplied by the host computers 104 in the request is referred to as the external LSD ID, which must be mapped to an internal LSD ID used by the storage controller 102, and particularly the microprocessor 204, to uniquely identify each of the logical storage devices 106. The host interface adapter 202 uses the mapping table 500 to perform the mapping from external LSD IDs to internal LSD IDs. Advantageously, the host interface adapter 202 performs the LSD ID mapping function, thereby offloading this function from the microprocessor 204 and freeing up the microprocessor 204 to perform its other functions more effectively. The host interface adapter 202 subsequently uses the mapped internal LSD ID with respect to the access control table 300 or 400 to perform the access control function rather than using the external LSD ID.

One advantage of the LSD ID mapping function is that it enables each of the host computers 104 to have its own view of the LSD ID space. Hence, for example, although the different host computers 104 may have access to different sets of the logical storage devices 106, which may be discontiguous with respect to internal LSD IDs, the mapping function enables the storage controller 102 to present to each host computer 104 a contiguous set of external LSD IDs. Additionally, the contiguous set of external LSD IDs may begin with LSD ID 0, which is particularly useful for some operating systems, such as UNIX style operating systems.

In one embodiment, the mapping table 500 resides in the buffer memory 212 of FIG. 2. In another embodiment, the mapping table 500 resides in the memory of the host interface adapter 202 that is used to store program instructions and data for the host interface adapter 202 sequencer.

The mapping table 500 includes an entry for each of the host computers 104 coupled to the host interface adapter 202. FIG. 5 illustrates an example of a mapping table 500 for the network 100 of FIG. 1; hence, the mapping table 500 has six entries. Each entry of the mapping table 500 includes a host ID field with an identifier of a host 104, such as a worldwide name. Each entry of the mapping table 500 also includes an external LSD ID to internal LSD ID mapping list field. The mapping list is a list of ordered pairs. The first element of each ordered pair is an external LSD ID and the second element of the ordered pair is the internal LSD ID to which the host ID and external LSD ID combination maps. An ordered pair exists in the mapping list for each possible external LSD ID which may be specified in a request by a host computer 104. For an external LSD ID that does not map to an internal LSD ID, the mapping table 500 of FIG. 5 shows an "X" in the second element of the ordered pair of the external LSD ID.

When the host interface adapter 202 receives a request from one of the host computers 104, the host interface adapter 202 extracts the host ID of the host computer 104 that sent the request and looks up the host ID in the mapping table 500 to find the corresponding entry. The host interface adapter 202 also extracts the external LSD ID from the request and looks up the ordered pair for the extracted external LSD ID to find the internal LSD ID mapped to the host ID and external LSD ID combination.

The mapping table 500 shown in FIG. 5 illustrates an embodiment in which the host computer 104 request specifies a SCSI LUN which corresponds to the external LSD ID. Hence, the mapping list in each entry of the mapping table 500 includes an ordered pair for each of LUNs 0 through 7, as shown.

Referring now to FIG. 6, a block diagram illustrating a mapping table 600 according to an alternate embodiment of the present invention is shown. The mapping table 600 includes an entry for each external LSD ID that a host computer 104 is allowed to specify in a request. The mapping table 600 shown in FIG. 6 illustrates an embodiment in which the host computer 104 specifies a SCSI LUN that corresponds to the external LSD ID. Hence, the mapping list in each entry of the mapping table 600 includes eight entries, one for each of LUNs 0 through 7, as shown. FIG. 6 illustrates a mapping table 600 for the network 100 of FIG. 1 as an example. Each entry of the mapping table 600 includes an external LSD ID field and a host ID to internal LSD ID mapping list field. The mapping list is a list of ordered pairs. The first element of each ordered pair is a host ID and the second element of the ordered pair is the internal LSD ID to which the host ID and external LSD ID combination maps. An ordered pair exists in the mapping list for each host ID of the host computers 104 coupled to the host interface adapter 202. For a host ID in a given external LSD ID entry that does not map to an internal LSD ID, the mapping table 600 of FIG. 6 shows an "X" in the second element of the ordered pair of the host ID.

When the host interface adapter 202 receives a request from one of the host computers 104, the host interface adapter 202 extracts the external LSD ID from the request and looks up the external ID in the mapping table 600 to find the corresponding entry. The host interface adapter 202 also extracts the host ID of the host computer 104 that sent the request and looks up the ordered pair for the extracted host ID to find the internal LSD ID mapped to the external LSD ID and host ID combination.

Figure 7:
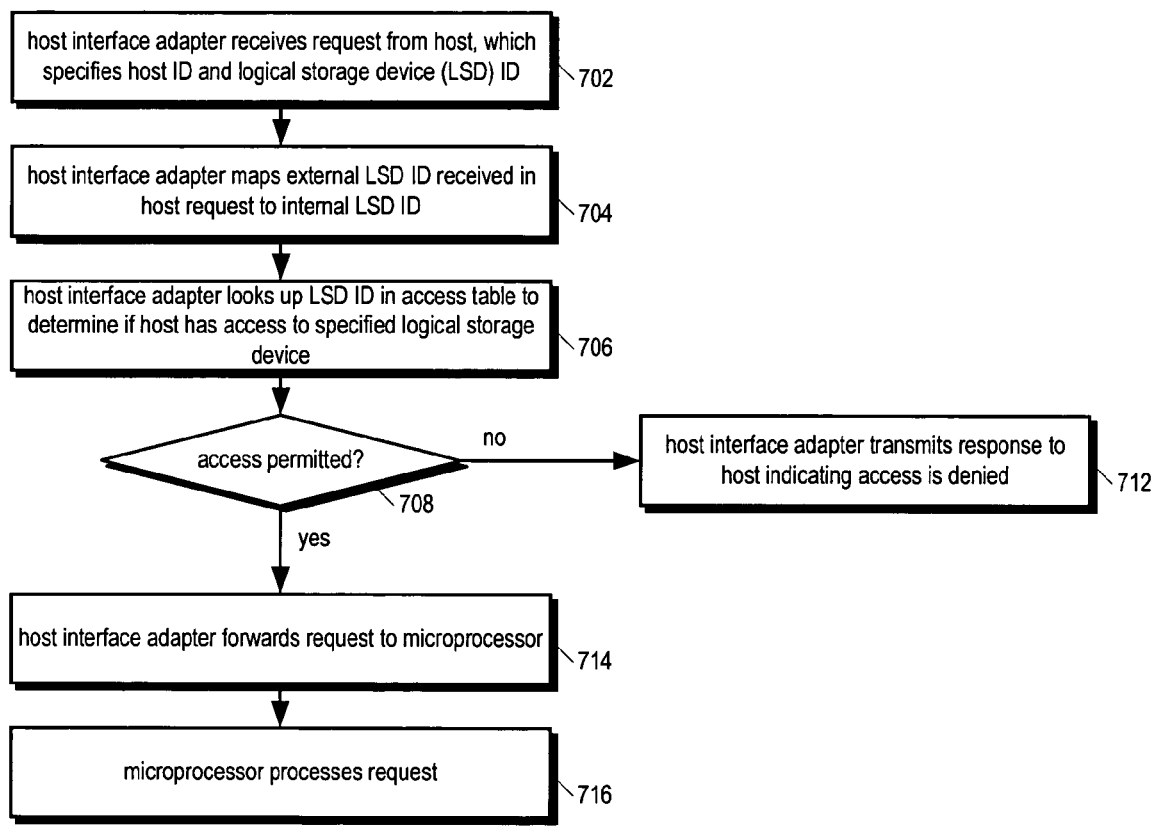
FIG. 7 is a flowchart illustrating operation of the storage controller of FIG. 1 to perform access control according to one embodiment of the present invention.

Referring now to FIG. 7, a flowchart illustrating operation of the storage controller 102 of FIG. 1 to perform access control according to one embodiment of the present invention is shown. Flow begins at block 702.

At block 702, the host interface adapter 202 receives a request from one of the host computers 104. The request specifies an identifier of the host computer 104 sending the request (host ID) and an identifier of the logical storage devices 106 (LSD ID) to be accessed which the host interface adapter 202 extracts from the request. In one embodiment, the LSD ID is an external LSD ID that must be mapped to an internal LSD ID. Flow proceeds to block 704.

At block 704, the host interface adapter 202 looks up the host ID and external LSD ID in a mapping table, such as mapping table 500 of FIG. 5 or mapping table 600 of FIG. 6, to map the external LSD ID to an internal LSD ID. In an embodiment in which the LSD ID specified in the request maps directly to the LSD ID of the logical storage device 106, block 704 is not performed. Flow proceeds to block 706.

At block 706, host interface adapter 202 looks up the mapped internal LSD ID and host ID in an access control table, such as access control table 300 of FIG. 3 or access control table 400 of FIG. 4, to determine whether the host has permission to access the specified logical storage device 106. Flow proceeds to decision block 708.

At decision block 708, the host interface adapter 202 determines whether the host computer 104 is permitted to access the logical storage device 106. Using the access control table 300 of FIG. 3 or the access control table 400 of FIG. 4, for example, the host interface adapter 202 would determine that if the LSD ID is 1 and the host ID is D, then access is permitted; however, if the LSD ID is 0 and the host ID is B, for example, then the host interface adapter 202 determines that access is not permitted. If the host computer 104 is permitted to access the logical storage device 106, flow proceeds to block 714; otherwise, flow proceeds to block 712.

At block 712, the host interface adapter 202 transmits a response to the host request indicating that access to the specified logical storage device 106 is denied. In one embodiment, the response includes a SCSI CHECK CONDITION status, and REQUEST SENSE data having a sense key of ILLEGAL REQUEST and an additional sense code of LOGICAL UNIT NOT SUPPORTED. Flow ends at block 712.

At block 714, the host interface adapter 202 provides the request to the microprocessor 204 since the host computer 104 is permitted to access the logical storage device 106. In one embodiment, the host interface adapter 202 provides the request to the microprocessor 204 by transferring the request into the buffer 212 and interrupting the microprocessor 204. In another embodiment, the host interface adapter 202 sets a flag, which the microprocessor 204 polls, to notify the microprocessor 204 of the presence of the request in the buffer 212. In one embodiment, the request includes the internal LSD ID of the logical storage device 106. In one embodiment, the request includes both the internal and external LSD ID of the logical storage device 106. Flow proceeds to block 716.

At block 716, the microprocessor 204 processes the request. In particular, if the request is a read data type request, the microprocessor 204 controls the storage device interface adapter 206 to cause the storage device interface adapter 206 to read the data specified by the host request from the appropriate physical block numbers of the physical storage devices comprising the logical storage device 106 into the buffer 212, and controls the host interface adapter 202 to cause the host interface adapter 202 to write the data from the buffer 212 to the host computer 104. If the request is a write data type request, the microprocessor 204 controls the host interface adapter 202 to cause the host interface adapter 202 to read the data specified by the host request from the host computer 104 into the buffer 212, and controls the storage device interface adapter 206 to cause the storage device interface adapter 206 to write the data from the buffer 212 to the appropriate physical block numbers of the physical storage devices comprising the logical storage device 106. In addition, the microprocessor 204 allocates space in the buffer 212 to buffer the data prior to transfer of the data into and out of the buffer 212. Furthermore, the microprocessor 204 translates the logical block number and number of blocks specified in the host I/O request to the physical block numbers and number of blocks on the physical storage devices comprising the logical storage device 106 specified in the host I/O request. Finally, the microprocessor 204 processes the host I/O request to perform the buffer 212 cache management function. For example, in the case of a host read request, the microprocessor 204 determines whether the data requested is present in the buffer 212 cache such that the data may be provided to the host computer 104 from the buffer 212 cache rather than being retrieved from the physical storage devices comprising the logical storage device 106. Similarly, in the case of a host write request, the microprocessor 204 determines which data in the buffer 212 cache must be replaced by the new data. Flow ends at block 716.

Figure 8:
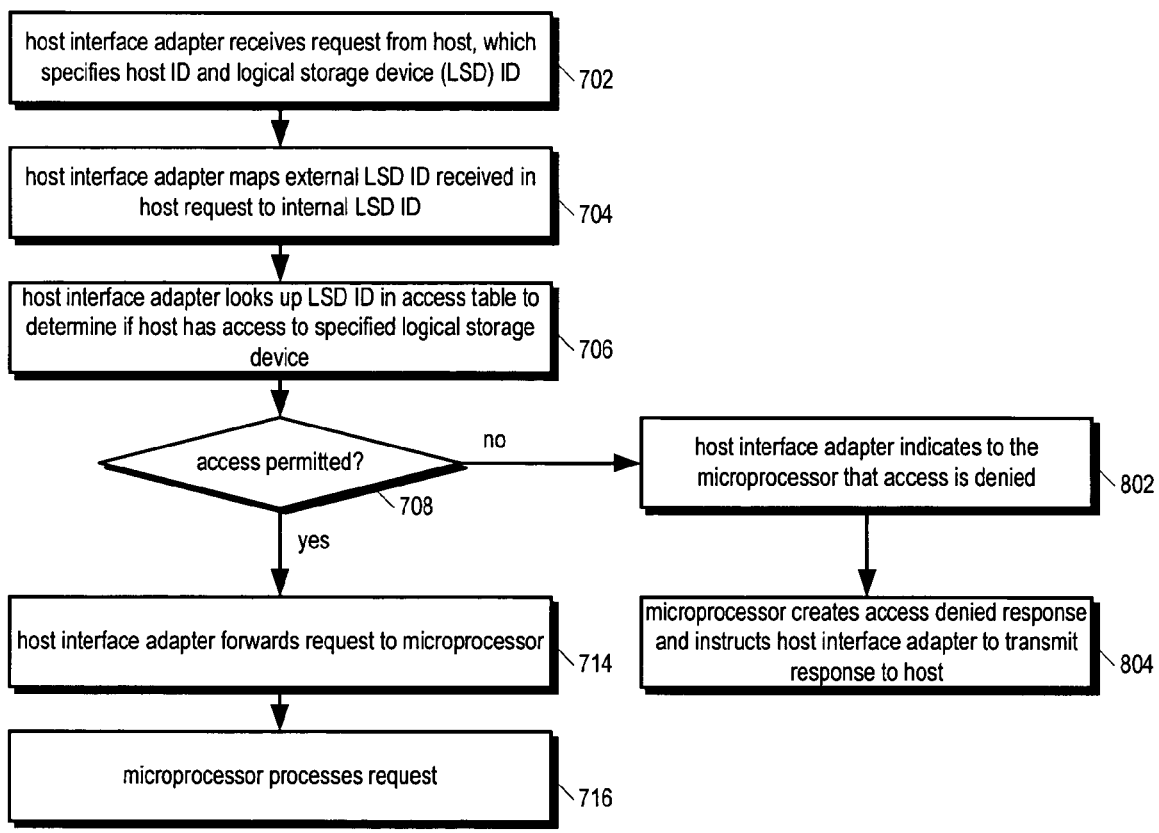
FIG. 8 is a flowchart illustrating operation of the storage controller of FIG. 1 to perform access control according to an alternate embodiment of the present invention.

Referring now to FIG. 8, a flowchart illustrating operation of the storage controller 102 of FIG. 1 to perform access control according to an alternate embodiment of the present invention is shown. The flowchart of FIG. 8 is similar to the flowchart of FIG. 7 and blocks 702 through 708 and 714 through 716 of FIG. 8 are identical to like-numbered blocks of FIG. 7. However, block 712 of FIG. 7 is not included in FIG. 8, and if at decision block 708 the host interface adapter 202 determines that the host computer 104 is not permitted to access the logical storage device 106, then flow proceeds to block 802.

At block 802, the host interface adapter 202 indicates to the microprocessor 204 that the host computer 104 specified in the request is not permitted to access the logical storage devices 106 specified in the request and provides the request to the microprocessor 204. Flow proceeds to block 804.

At block 804, the microprocessor 204 generates a response to the host request indicating that access to the specified logical storage device 106 is denied, similar to the response generated at block 712 of FIG. 7. The microprocessor 204 then controls the host interface adapter 202 to transmit the response to the host computer 104. Flow ends at block 804.

Figure 9:
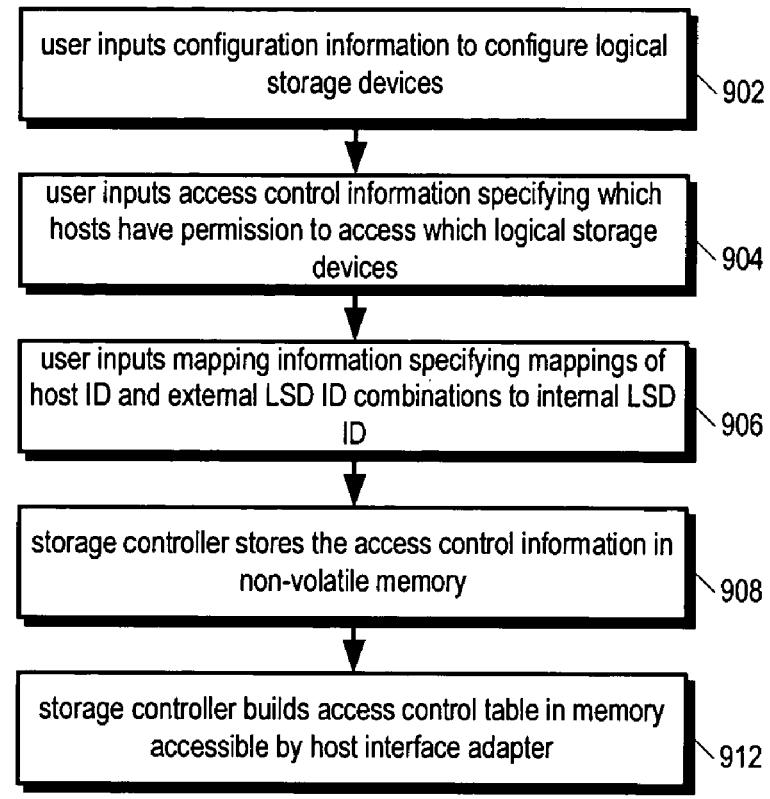
FIG. 9 is a flowchart illustrating operation of the storage controller of FIG. 1 to create the access tables of FIGS. 3 and 4 according to the present invention.

Referring now to FIG. 9, a flowchart illustrating operation of the storage controller 102 of FIG. 1 to create access control tables such as the access control tables 300 and 400 of FIGS. 3 and 4 and mapping tables such as mapping tables 500 and 600 of FIGS. 5 and 6 according to the present invention is shown. Flow begins at block 902.

At block 902, a user, such as a network administrator, inputs configuration information to configure the logical storage devices 106. The user may configure a single physical storage device as a logical storage device 106. The user may also configure a grouping of physical storage devices using any of well-known methods for grouping storage devices, including but not limited to mirroring, striping, or other redundant array of inexpensive disk (RAID) methods as a logical storage device 106. The user may also configure a portion of a physical storage device or a portion of a grouping of storages devices as a logical storage device 106. In one embodiment, the user also assigns an internal LSD ID to each logical storage device 106 he creates. In one embodiment, the storage controller 102 assigns an internal LSD ID to each logical storage device 106 created by the user. In one embodiment, the user inputs the configuration information via the management controller 214 of FIG. 2. In one embodiment, the user inputs the configuration information via one of the host computers 104. In one embodiment, the user inputs the configuration information via a serial port included in the south bridge of the storage controller 102. Flow proceeds to block 904.

At block 904, the user inputs access control information that specifies which of the host computers 104 has access to which of the logical storage devices 106. Flow proceeds to block 906.

At block 906, the user inputs mapping information. The mapping information specifies mappings of host ID and external LSD ID combinations to internal LSD IDs. In one embodiment, the user inputs the access control and mapping information via the management controller 214 of FIG. 2. In one embodiment, the user inputs the access control and mapping information via one of the host computers 104. In one embodiment, the user inputs the access control and mapping information via the south bridge serial port. Flow proceeds to block 908.

At block 908, the storage controller 102 stores the access control information input by the user at block 904 and mapping information input by the user at block 906 into a non-volatile memory. In one embodiment, the storage controller 102 stores the access control information into a portion of one or more of the logical storage devices 106 reserved for use by the storage controller 102 rather than for use by users of the network 100. In one embodiment, the storage controller 102 stores the access control information into a non-volatile memory, such as a FLASH memory included in storage controller 102. Flow proceeds to block 912.

At block 912, the storage controller 102 builds an access control table, such as the access control table 300 of FIG. 3 or the access control table 400 of FIG. 4, and builds a mapping table, such as the mapping table 500 of FIG. 5 or the mapping table 600 of FIG. 6, in a memory accessible by the host interface adapter 202. In one embodiment, the storage controller 102 builds the access control table and mapping table in the buffer 212.

In one embodiment, the storage controller 102 builds the access control table and mapping table in the memory of the host interface adapter 202 that is used to store program instructions and data for the host interface adapter 202 sequencer. Flow ends at block 912.

In one embodiment, the management controller 214 builds the access table and mapping table and manages the storage of them to the non-volatile memory. The microprocessor 204 provides a method for the management controller 214 to pass messages to the host interface adapter 202 to store and update the access control and mapping tables. In one embodiment, the microprocessor 204 is unaware of the access control table contents or the management controller 214 to host interface adapter 202 message contents. In another embodiment, the microprocessor 204 builds the access control and mapping tables and manages the storage of them to the non-volatile memory.

Figure 10:
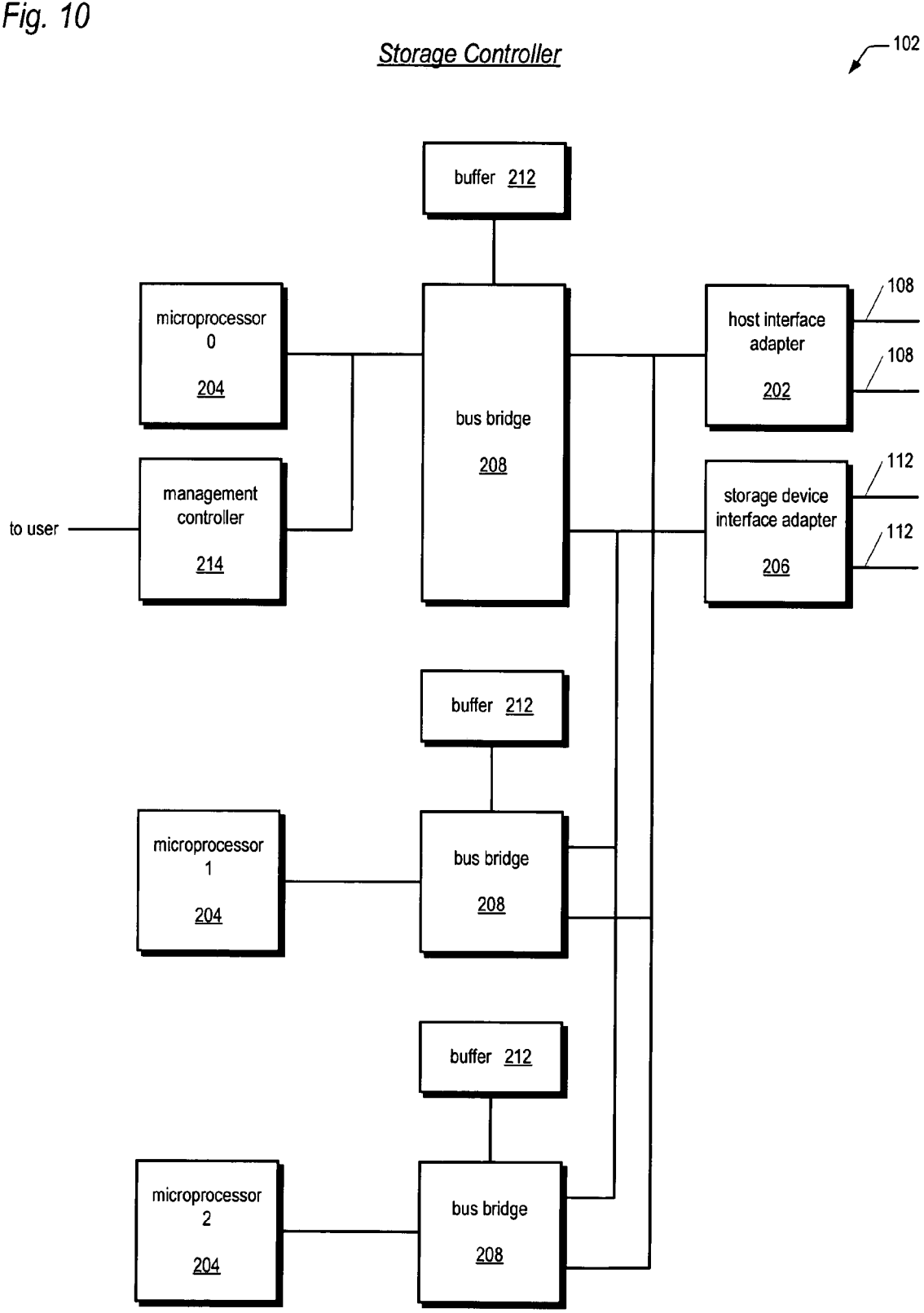
FIG. 10 is a block diagram of the storage controller of FIG. 1 according to an alternate embodiment of the present invention.

Referring now to FIG. 10, a block diagram of the storage controller 102 of FIG. 1 according to an alternate embodiment of the present invention is shown. The storage controller 102 of FIG. 10 is similar to the storage controller 102 of FIG. 1; however, the storage controller 102 of FIG. 10 includes a plurality of microprocessors 204, buffers 212, and bus bridges 208, rather than a single microprocessor 204, buffer 212, and bus bridge 208 of FIG. 1. The embodiment of FIG. 10 includes three microprocessors 204, three buffers 212, and three bus bridges 208. The microprocessors 204 are denoted microprocessor 0 204, microprocessor 1 204, and microprocessor 2 204. However, the number of microprocessors 204 comprised in the storage controller 102 may vary.

Each microprocessor 204 is coupled to its respective bus bridge 208 via a respective local bus, and each of the bus bridges 208 is coupled to both the host interface adapter 202 and the storage device interface adapter 206 via a local bus. In the embodiment of FIG. 10, each of the microprocessors 204 is designated to perform host request processing for a subset of the logical storage devices 106. In one embodiment, the user provides input to designate which of the microprocessors 204 will perform the request processing for which subset of logical storage devices 106. In one embodiment, the storage controller 102 designates which of the microprocessors 204 will perform the request processing for which subset of logical storage devices 106 based on a load-balancing algorithm. Because of the presence of multiple microprocessors 204 to process host requests, when a host request is received, the storage controller 102 must determine which of the microprocessors 204 to route the request to. One possibility is to route the request to one of the microprocessors 204, and if the microprocessor 204 is not designated to process requests for the logical storage device 106 specified in the request, the microprocessor 204 can route the request to the microprocessor 204 designated to process requests for the logical storage device 106. However, this approach adds more processing burden to already potentially overloaded microprocessors 204. Advantageously, a method is described with respect to the remaining Figures in which the host interface adapter 202 performs the request routing function.

Figure 11:
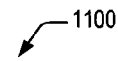
FIG. 11 is a block diagram illustrating an access control table of the storage controller of FIG. 10 according to an alternate embodiment of the present invention.

Referring now to FIG. 11, a block diagram illustrating an access control table 1100 of the storage controller 102 of FIG. 10 according to an alternate embodiment of the present invention is shown. The access control table 1100 is similar to the access control table 300 of FIG. 3. However, the access control table 1100 of FIG. 11 includes an additional microprocessor field for each entry. The microprocessor field specifies one of the microprocessors 204 of FIG. 10 that is designated to process host requests for the logical storage devices 106 of the entry. In the example shown in FIG. 11, microprocessor 0 204 is designated to process requests for LSD IDs 0 and 4 through 7; microprocessor 1 204 is designated to process requests for LSD IDs 2 and 3; and microprocessor 2 204 is designated to process requests for LSD ID 1.

Figure 12:
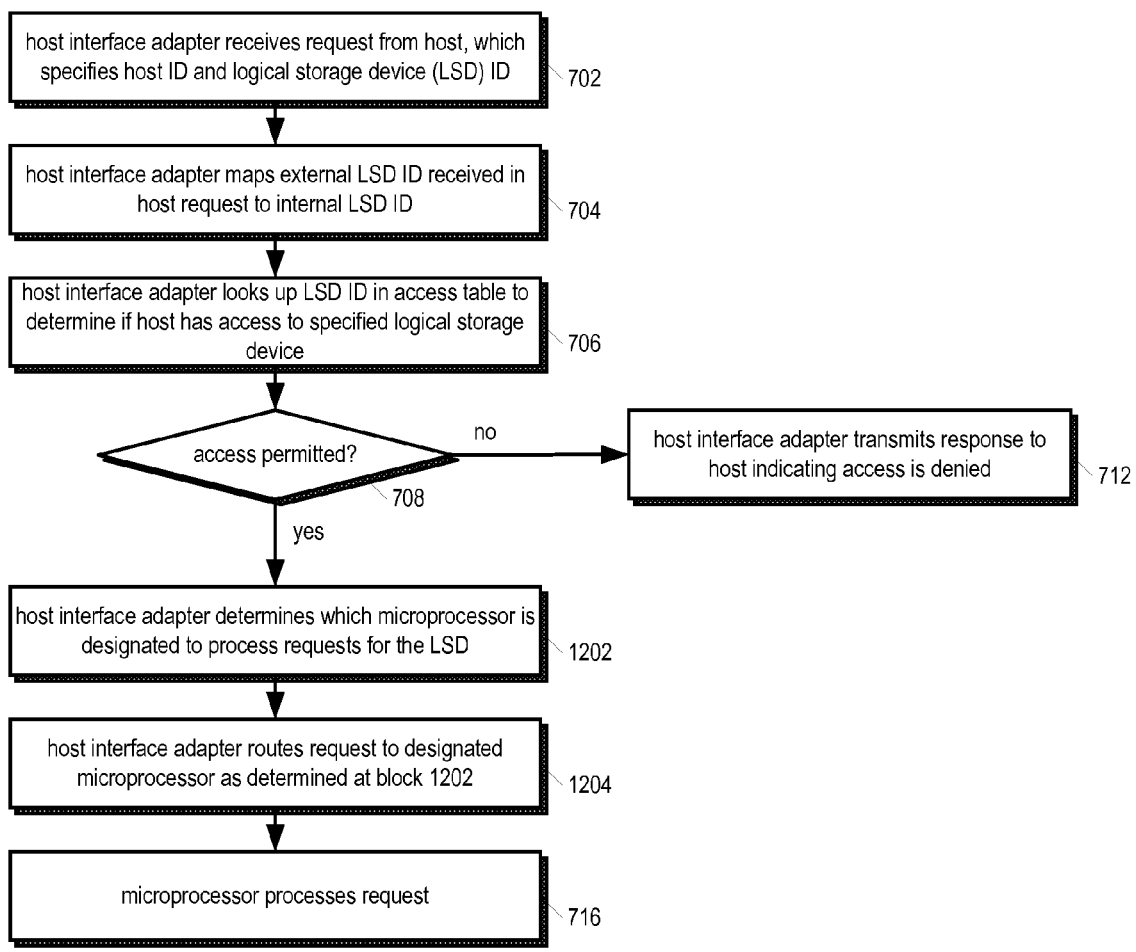
FIG. 12 is a flowchart illustrating operation of the storage controller of FIG. 10 to perform access control according to an alternate embodiment of the present invention supporting host request routing by the host interface adapter.

Referring now to FIG. 12, a flowchart illustrating operation of the storage controller 102 of FIG. 10 to perform access control according to an alternate embodiment of the present invention supporting host request routing by the host interface adapter is shown. The flowchart of FIG. 12 is similar to the flowchart of FIG. 7 and blocks 702 through 712 and 716 of FIG. 12 are identical to like-numbered blocks of FIG. 7. However, block 714 is not included in FIG. 12, and if at decision block 708 the host interface adapter 202 determines that the host computer 104 is permitted to access the logical storage device 106, then flow proceeds to block 1202.

At block 1202, the host interface adapter 202 determines from the access control table 1100 of FIG. 11 which of the microprocessors 204 of FIG. 10 is designated to process requests for the logical storage device 106 identified in the request and mapped to an internal LSD ID at block 704. Flow proceeds to block 1204.

At block 1204, the host interface adapter 202 routes the request to the one of the microprocessors 204 which is designated to process requests for the logical storage devices 106 as determined at block 1202. Flow proceeds from block 1204 to block 716.

Although the request routing function is illustrated with the access control embodiment shown in FIG. 7, in one embodiment, the request routing function may also be performed with the access control embodiment shown in FIG. 8.

Although the present invention and its objects, features and advantages have been described in detail, other embodiments are encompassed by the invention. For example, although the invention is described as providing access control on a host computer basis, the invention is not limited to such. Other embodiments are contemplated in which the host interface adapter provides access control on other bases, such as on an IP address basis, a SCSI ID basis, or an individual user ID basis. In these embodiments, the storage controller creates an access control table based on user input in which each logical storage device is granted or denied access on the alternate access control basis. The host interface adapter extracts the alternate access control basis identifier from the host request, and using the identifier determines whether the entity associated with the identifier has permission to access the specified logical storage device. Additionally, although certain embodiments for the access control table have been described, the invention is not limited to the particular embodiments shown. Other embodiments may be employed that specify the relationship between the entity requesting access and that entity's permission to access the specified logical storage device. Furthermore, although an embodiment of the storage controller has been described having only a single host interface adapter and single storage device interface adapter, other embodiments include multiple host interface adapters and/or storage device interface adapters. Still further, although embodiments have been described in which the logical storage device identifier is specified as a SCSI LUN, the invention is susceptible to other embodiments in which the logical storage device identifier is specified according to another protocol. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A storage controller, comprising:
 a device interface adapter, for interfacing the storage controller to a plurality of logical storage devices;
 a host interface adapter, for interfacing the storage controller to a plurality of host computers; and
 a microprocessor, coupled to said device interface adapter and said host interface adapter, for processing requests to transfer data between said plurality of logical storage devices and said plurality of host computers;
 wherein each of said requests specifies one of said plurality of host computers and one of said plurality of logical storage devices for transferring said data between, wherein said host interface adapter is configured to receive said requests and to determine for each of said requests whether the host computer identified in said request is allowed to access the logical storage device identified in said request.

2. The storage controller of claim 1, wherein if said host interface adapter determines said host computer identified in said request is allowed to access said logical storage device identified in said request, said host interface adapter provides said request to said microprocessor, wherein said microprocessor responsively controls said device interface adapter to cause said device interface adapter to access said logical storage device specified in said request to transfer said data between said logical storage device and the storage controller.

3. The storage controller of claim 1, wherein if said host interface adapter determines said host computer identified in said request is not allowed to access said logical storage device identified in said request, said host interface adapter transmits to said host computer a response indicating that said host computer identified in said request is not allowed to access said logical storage device identified in said request.

4. The storage controller of claim 1, wherein if said host interface adapter determines said host computer identified in said request is not allowed to access said logical storage device identified in said request, said host interface adapter provides to said microprocessor an indication that said host computer identified in said request is not allowed to access said logical storage device identified in said request.

5. The storage controller of claim 4, wherein said microprocessor causes said host interface adapter to transmit a response to said host computer identified in said request in response to said indication, wherein said response indicates said host computer is not allowed to access said logical storage device identified in said request.

6. The storage controller of claim 1, wherein said host interface adapter is configured to interface said storage controller to said one or more host computers via an interface protocol.

7. The storage controller of claim 6, wherein said interface protocol comprises Fibre Channel.

8. The storage controller of claim 6, wherein said interface protocol comprises Small Computer Systems Interface (SCSI).

9. The storage controller of claim 6, wherein said interface protocol comprises Internet SCSI (iSCSI).

10. The storage controller of claim 6, wherein said interface protocol comprises one of the following protocols: Infiniband, Ethernet, TCP/IP, HIPPI, Token Ring, Arcnet, FDDI, LocalTalk, ESCON, FICON, ATM, SAS, SATA, and combinations thereof.

11. The storage controller of claim 1, further comprising:
a buffer memory, coupled to said device interface adapter and said host interface adapter, for buffering data transferred between said plurality of host computers and said plurality of logical storage devices via said host interface adapter and said device interface adapter.

12. The storage controller of claim 11, wherein said microprocessor manages use of said buffer memory by said host interface adapter and said device interface adapter.

13. The storage controller of claim 1, wherein said microprocessor performing said processing requests comprises performing redundant array of inexpensive disks (RAID) processing.

14. The storage controller of claim 1, wherein said plurality of logical storage devices comprise one or more physical storage devices.

15. The storage controller of claim 1, wherein said plurality of logical storage devices comprise one or more disk storage devices.

16. The storage controller of claim 1, wherein said plurality of logical storage devices comprise one or more CDROM storage devices.

17. The storage controller of claim 1, wherein said plurality of logical storage devices comprise one or more tape storage devices.

18. The storage controller of claim 1, further comprising:
a plurality of said microprocessors, coupled to said host interface adapter and said device interface adapter, wherein said host interface adapter determines which one of said plurality of microprocessors is configured to process requests for said logical storage device identified in said request and provides said request to said determined one of said plurality of microprocessors.

19. The storage controller of claim 1, wherein each of said requests specifies one of said plurality of host computers based on a unique world wide name.

20. The storage controller of claim 1, wherein each of said requests specifies one of said plurality of host computers based on an internet protocol address.

21. The storage controller of claim 1, wherein each of said requests specifies one of said plurality of host computers based on an identifier in a SCSI request.

22. The storage controller of claim 1, wherein each of said requests specifies one of said plurality of logical storage devices in a protocol-specific manner.

23. The storage controller of claim 22, wherein said protocol-specific manner comprises an identifier in a SCSI request.

24. A storage controller for providing hosts controlled access to logical storage devices, comprising:
a memory, for storing an access table specifying which of the hosts has access to which of the logical storage devices; and
an interface adapter, coupled to said memory, configured to interface the storage controller with a transport medium, receive on said transport medium from one of the hosts a request to access one of the logical storage devices, and determine from said access table whether said one of the hosts has access to said one of the logical storage devices.

25. The storage controller of claim 24, wherein said interface adapter is configured to interface the storage controller with said transport medium according to a predetermined protocol.

26. The storage controller of claim 25, wherein said predetermined protocol comprises Fibre Channel.

27. The storage controller of claim 25, wherein said predetermined protocol comprises Small Computer Systems Interface (SCSI).

28. The storage controller of claim 25, wherein said predetermined protocol comprises Internet SCSI (iSCSI).

29. The storage controller of claim 25, wherein said predetermined protocol comprises one of the following protocols: Infiniband, Ethernet, TCP/IP, HIPPI, Token Ring, Arcnet, FDDI, LocalTalk, ESCON, FICON, ATM, SAS, SATA, and combinations thereof.

30. The storage controller of claim 25, wherein said predetermined protocol comprises a low-level block protocol.

31. The storage controller of claim 24, further comprising:
a microprocessor, coupled to said interface adapter, for programming said interface adapter to cause said interface adapter to transfer data on said transport medium.

32. The storage controller of claim 31, wherein if said interface adapter determines that said one of the hosts has access to said one of the logical storage devices, said interface adapter provides said request to said microprocessor, and said microprocessor responsively processes said request to cause said one of the logical storage devices to be accessed.

33. The storage controller of claim 31, wherein said microprocessor comprises a general purpose microprocessor.

34. The storage controller of claim 31, wherein said microprocessor is distinct from said interface adapter.

35. The storage controller of claim 31, further comprising:
a buffer memory, coupled to said interface adapter, for buffering data transferred between the hosts and the logical storage devices.

36. The storage controller of claim 35, wherein said microprocessor is configured to manage use of said buffer memory for buffering said data.

37. The storage controller of claim 35, wherein said interface adapter includes a direct memory access controller for controlling transfers of said data between said interface adapter and said buffer memory.

38. The storage controller of claim 35, wherein said buffer memory comprises said memory for storing said access table.

39. The storage controller of claim 31, wherein said microprocessor does not include a direct memory access controller.

40. The storage controller of claim 31, further comprising:
a storage device interface adapter, coupled to said microprocessor, configured to interface the storage controller with the logical storage devices.

41. The storage controller of claim 40, wherein said microprocessor causes said storage device interface adapter to transfer data between the logical storage devices and the storage controller in response to said interface adapter providing said request to said microprocessor.

42. The storage controller of claim 24, wherein said interface adapter comprises a single integrated circuit.

43. The storage controller of claim 24, wherein said interface adapter comprises a set of integrated circuits specialized for performing a predetermined protocol on said transport medium.

44. The storage controller of claim 24, wherein the storage controller creates said access table in said memory in response to user input.

45. The storage controller of claim 44, further comprising:
a management controller, coupled to said memory, for creating said access table in response to user input.

46. The storage controller of claim 24, wherein said interface adapter maps a first identifier to a second identifier, wherein said first identifier is included in said request and is used by the host to specify said one of the logical storage devices, wherein said second identifier is used by the storage controller to specify said one of the logical storage devices.

47. The storage controller of claim 46, wherein said interface adapter uses said second identifier to determine from said access table whether said one of the hosts has access to said one of the logical storage devices.

48. The storage controller of claim 24, wherein said memory for storing said access table is comprised within said interface adapter.

49. The storage controller of claim 24, wherein said memory for storing said access table is directly coupled to said interface adapter.

50. A method for controlling access by host computers to logical storage devices, the method comprising:
performing a protocol to receive a request from a host computer to access a logical storage device;
determining whether the host computer has access to the logical storage device; and
causing the logical storage device to transfer data, if the host computer has access to the logical storage device based on said determining; and
transmitting a response to the host computer indicating access is denied, if the host computer does not have access to the logical storage device based on said determining;
wherein said performing the protocol and said determining are performed by an interface adapter, and said causing the logical storage device to transfer the data is performed by a microprocessor distinct from the interface adapter.

51. A storage controller for providing virtual local storage on remote storage devices to hosts, comprising:
a buffer providing memory work space for the storage controller;
a first interface adapter operable to connect to and interface with a first transport medium, operable to implement access controls for storage space on the storage devices;
a second interface adapter operable to connect to and interface with a second transport medium; and
a microprocessor coupled to the first interface adapter, the second interface adapter and the buffer, the microprocessor operable to map between hosts connected to the first transport medium and the storage devices and to process data in the buffer to interface between the first interface adapter and the second interface adapter to allow access from hosts connected to the first transport medium to the storage devices using native low level, block protocols.

52. A storage controller for providing host computers access to storage devices, comprising:
a microprocessor, for identifying each of the storage devices according to a unique internal identifier, and for processing requests to access the storage devices, each of said requests including a host identifier and an external identifier, said host identifier identifying one of the host computers making said request, and said external identifier identifying one of the storage devices to be accessed; and
a host interface adapter, coupled to said microprocessor, for receiving said requests from the host computers and mapping said external identifier received in said request to its said unique internal identifier based on said host identifier received in said request.

53. The storage controller of claim 52, further comprising:
a mapping table, accessible by said host interface adapter, for storing mapping information, wherein said host interface adapter maps said external identifier received in said request to its said unique internal identifier based on said host identifier received in said request using said mapping information stored in said mapping table.

54. The storage controller of claim 53, wherein each unique combination of host identifier and external identifier identifies a single one of the storage devices according to a many-to-one mapping.

55. The storage controller of claim 52, wherein said host interface adapter provides said unique internal identifier and said request to said microprocessor for processing after said mapping said external identifier to said unique internal identifier.

56. The storage controller of claim 52, wherein said host interface adapter is further configured to perform a low-level protocol to interface the storage controller with the host computers.

57. The storage controller of claim 52, wherein said unique internal identifier identifies a logical storage device, wherein said logical storage device comprises a grouping of physical storage devices.

58. The storage controller of claim 52, wherein said unique internal identifier identifies a logical storage device, wherein said logical storage device comprises a portion of a grouping of physical storage devices.

59. The storage controller of claim 52, wherein said unique internal identifier identifies a logical storage device, wherein said logical storage device comprises a portion of a physical storage device.

60. The storage controller of claim 52, wherein each of said requests specifies one of the storage devices in said external identifier in a protocol-specific manner.

61. The storage controller of claim 60, wherein said protocol-specific manner comprises a SCSI logical unit number.

62. The storage controller of claim 52, wherein said external identifier comprises a SCSI logical unit number.

63. The storage controller of claim 52, wherein said host interface adapter is further configured to perform access control based on said unique internal identifier and said host identifier.

64. A method for mapping host-specific storage device identifiers to storage controller-specific storage device identifiers, the method comprising:
  receiving from a host computer a request to access one of a plurality of storage devices coupled to a storage controller, the request specifying an identifier of the host computer and an identifier of the one of the plurality of storage devices, wherein said receiving is performed by a host interface adapter of the storage controller;
  mapping a combination of the host computer identifier and the identifier of the one of the plurality of storage devices to a unique identifier used by a microprocessor of the storage controller to identify the one of the plurality of storage devices, wherein said mapping is performed by the host interface adapter; and
  providing the unique identifier to the microprocessor for processing the request, wherein said providing is performed by the host interface adapter.

65. A storage controller, comprising:
  a first microprocessor, for processing requests from a host computer to access one of a first set of logical storage devices coupled to the storage controller;
  a second microprocessor, for processing requests from said host computer to access one of a second set of logical storage devices coupled to the storage controller; and
  an interface adapter, coupled to said first and second microprocessors, for receiving said requests from said host computer, and for each of said requests determining whether said request specifies a logical storage device in said first set or said second set and providing said request to one of said first and second microprocessors based on said determining.

66. The storage controller of claim 65, wherein said first and second set of logical storage devices are distinct.

67. The storage controller of claim 65, wherein said first and second set of logical storage devices are programmable.

68. The storage controller of claim 65, wherein said first and second set of logical storage devices are user-configurable.

69. A storage controller for providing virtual local storage on remote storage devices to hosts, comprising:
  a buffer providing memory work space for the storage controller;
  a first interface adapter operable to connect to and interface with a first transport medium, operable to map between hosts connected to the first transport medium and the storage devices;
  a second interface adapter operable to connect to and interface with a second transport medium; and
  a microprocessor coupled to the first interface adapter, the second interface adapter and the buffer, the microprocessor operable to implement access controls for storage space on the storage devices and to process data in the buffer to interface between the first interface adapter and the second interface adapter to allow access from hosts connected to the first transport medium to the storage devices using native low level, block protocols.

* * * * *